(12) United States Patent
Blair et al.

(10) Patent No.: US 6,358,590 B1
(45) Date of Patent: Mar. 19, 2002

(54) NOISE ATTENUATION PANEL

(75) Inventors: Alan John Blair, Holywood; Richard Parkes, Newtownards, both of (IE); Kelly Ruth, Kirkland, WA (US)

(73) Assignee: Short Brothers PLC, Bedfast (IE)

( * ) Notice: Subject to any disclaimer, the term of this patent is extended or adjusted under 35 U.S.C. 154(b) by 0 days.

(21) Appl. No.: 09/417,638

(22) Filed: Oct. 14, 1999

Related U.S. Application Data

(62) Division of application No. 08/883,093, filed on Jun. 26, 1997, now abandoned.

(30) Foreign Application Priority Data

Jun. 28, 1996 (GB) .............................................. 9613615

(51) Int. Cl.$^7$ ................................................. B32B 3/00
(52) U.S. Cl. ........................ 428/73; 428/116; 428/131; 52/145; 244/53
(58) Field of Search ................................ 428/116, 118, 428/131, 73; 52/145; 244/53; 123/41.7

(56) References Cited

U.S. PATENT DOCUMENTS

| 4,257,998 A | 3/1981 | Diepenbrock, Jr. et al. . 264/156 |
| 4,465,725 A | 8/1984 | Riel ............................ 428/116 |
| 4,539,245 A | 9/1985 | Sarin et al. .................. 428/116 |

FOREIGN PATENT DOCUMENTS

| DE | 43 16 843 A1 | 11/1994 |
| GB | 2 038 410 A | 7/1980 |
| GB | 2 223 448 A | 4/1990 |
| GB | 2 247 712 A | 3/1992 |
| WO | WO 94/26995 | 11/1994 |

OTHER PUBLICATIONS

Search Report 1.
Search Report 2.

*Primary Examiner*—Deborah Jones
*Assistant Examiner*—Wendy Boss
(74) *Attorney, Agent, or Firm*—Lyon & Lyon LLP

(57) ABSTRACT

A noise attenuation panel for an aircraft engine nacelle structure comprises a cellular core having a multiplicity of cells and a facing sheet having a multiplicity of holes which provide for gaseous fluid communication between the cellular core and the front face of the facing sheet. Each hole in the facing sheet has a bore diameter which increases along the bore in the direction of the rear face of the facing sheet throughout the bore or a part of the bore and which does not at any point of the bore decrease along the bore in the direction of the rear face of the facing sheet. Prior to assembly of the facing sheet and the core the holes are formed by electron beam drilling from an entrance face of the facing sheet through to an exit face and the facing sheet and the cellular core are assembled to form the panel in such disposition that the exit face forms the front face of the facing sheet and the entrance face forms the rear face of the facing sheet.

12 Claims, 4 Drawing Sheets

NOISE ATTENUATION PANEL

This application is a divisional application of U.S. patent application Ser. No. 08/883,093, filed Jun. 26, 1997 now abandoned. U.S. patent application Ser. No. 08/883,093 is hereby incorporated herein by reference.

BACKGROUND OF THE INVENTION

The present invention relates to noise attenuation panels and to a method of manufacturing a noise attenuation panel.

SUMMARY OF THE INVENTION

Noise attenuation panels are widely used for attenuating noise produced by aircraft engines and are located at optimised positions in the flow ducts of aircraft engine nacelle structures. Such flow ducts primarily comprise the inlet duct, the fan duct and the nozzle assembly.

A typical noise attenuation panel comprises a sound reflecting solid backing plate or sheet, a perforate metal facing plate or sheet and a honeycomb or cellular core which is bonded between the backing and facing sheets which partitions the air into a multiplicity of separate cells.

When the noise attenuation panel is mounted in a flow duct of an aircraft engine nacelle structure with the facing sheet exposed to sound waves generated in the duct, the sound waves become subjected to three mechanisms which result in a reduction of the sound energy by conversion thereof to heat energy, namely:

(i) friction in the facing sheet, (ii) pressure loss when duct pressure sound waves expand into the cells of the honeycomb or cellular core, and (iii) 'reactive' cancellation of the direct incident sound wave by the wave that is reflected from the solid backing sheet, the honeycomb cell depth being 'tuned' to the required frequency.

Noise attenuation panels are obviously important acoustically but, because of the hostile environment in which they operate, there is also an evident need for structural rigidity. As they form part of an aircraft engine nacelle structure it is important that the complete component is provided with adequate strength to withstand the inflight conditions to which an exposed area of a nacelle structure is susceptible. Moreover, noise attenuation panels are often so configured as to add strength to the nacelle structure into which they are to be installed.

The perforate facing sheets of noise attenuation panels heretofore proposed have commonly been perforated by punching or mechanical drilling. Current noise attenuation panel constructions use perforate facing sheets with holes typically of diameter between 0.020" and 0.060" positioned in an equi-spaced triangular array such as to provide open areas within the limits of 3 and 20%.

The porosity of the facing sheet of a noise attenuation panel may be designed to meet specific flow resistances by either changing the hole size, the spacing between the holes or by changing both. Acoustic research has demonstrated that hole size and open area are critical with regard to the attenuation properties of noise attenuation panels.

Current manufacturing procedures do not realistically allow the provision of very small hole diameters and very small spacing. In metal sheets, punching for example dictates a minimum hole diameter of 0.020". Mechanical drilling can produce holes with diameters as low as 0.010", but this is highly impractical with the lowest practical hole diameter being 0.020".

It is an object of the present invention to provide a method of manufacturing a noise attenuation panel in which the holes in the facing sheet can readily be made with diameters and spacings smaller than that which can be achieved by punching or mechanical drilling.

The holes provided in perforate facing sheets of heretofore proposed noise attenuation panels are susceptible to blockage by particles. Such blockages of the gaseous fluid communication flow paths between the cells of the cellular core and the front face of the facing sheet reduces the effectiveness of the panel to attenuate noise. Where holes in the facing sheet are formed with very small diameters, they become even more susceptible to blockage which then places a limit on the smallest hole diameter which can be successfully used in practical applications.

It is another object of the present invention to provide a noise attenuation panel and a method of manufacturing a noise attenuation panel in which the holes in the facing sheet of the panel are formed with diameters and spacings smaller than those which can be achieved by punching or mechanical drilling and which are so configured as to be less susceptible to blockage than holes of the same diameter and not so configured.

According to a first aspect of the present invention there is provided a method of manufacturing a noise attenuation panel which comprises:

a cellular component part having a front face, a rear face and a structure which defines a multiplicity of cells between the front face and the rear face, and a facing component part which:

has a front face and a rear face, extends across the ends of the cells of the cellular component part at the front face thereof with the rear face of the facing component part adjacent the front face of the cellular component part, and is provided with a multiplicity of holes therethrough to provide gaseous fluid communication between the cells of the cellular component part and the front face of the facing component part for the attenuation of noise generated by gaseous fluid flow over the surface of the front face of the facing component part, the method comprising:

a first processing step of forming the cellular component part, a second processing step of forming the facing component part, and a third processing step of bringing the two component parts together in the formation of the noise attenuation panel, characterised in that:

the second processing step comprises subjecting a blank facing component part to electron beam drilling at an entrance face thereof to produce a multiplicity of drilled holes through the facing component part from the entrance face to an opposite exit face under conditions in which each drilled hole has a bore diameter which decreases from the entrance face to the exit face throughout the bore or at least a part of the bore and which does not increase at any point of the bore, and the third processing step comprises bringing the facing component part formed in the second processing step and the cellular component part formed in the first processing step together in such disposition that the exit face forms the front face of the facing component part and the entrance face forms the rear face of the facing component part.

In an embodiment of the invention according to its first aspect hereinafter to be described, the second processing step comprises subjecting the facing component part to electron beam drilling to produce a multiplicity of drilled holes through the facing component part in which each drilled hole has a bore diameter which decreases in the region of the exit face of the facing component part to a minimum bore diameter at the exit face.

In a preferred embodiment of the invention according to its first aspect the second processing step comprises subjecting the facing component part to electron beam drilling to produce the multiplicity of drilled holes with bore diameters not greater than 0.020". The electron beam drilling may furthermore advantageously produce the multiplicity of drilled holes with bore diameters in the range of 0.002" to 0.020".

In an embodiment of the invention according to its first aspect, the second processing step comprises subjecting the facing component part to electron beam drilling to produce the multiplicity of drilled holes having a spacing between adjacent holes not greater than 0.11". The electron beam drilling may advantageously produce the multiplicity of drilled holes having a spacing between adjacent holes in the range of 0.004" to 0.11".

According to a second aspect of the invention, there is provided a noise attenuation panel produced by the method according to the first aspect of the invention.

According to a third aspect of the invention there is provided a noise attenuation panel which comprises:
  a cellular component part having a front face, a rear face and a structure which defines a multiplicity of cells between the front face and the rear face,
  a facing component part which:
    has a front face and a rear face,
    extends across the ends of the cells of the cellular component part at the front face thereof with the rear face of the facing component part adjacent the front face of the cellular component part, and
    is provided with a multiplicity of holes which extend through the facing component part from the front face to the rear face to provide gaseous fluid communication between the cells of the cellular component part and the front face of the facing component part for the attenuation of noise generated by gaseous fluid flow over the surface of the front face of the facing component part,
  characterised in that:
    each of the multiplicity of holes in the facing component part has a bore diameter which increases along the bore in the direction of the rear face of the facing component part throughout the bore or at least a part or parts of the bore and which does not at any point of the bore decrease along the bore in the direction of the rear face of the facing component part.

In an embodiment of the invention according to its third aspect, each of the multiplicity of holes in the facing component part has a bore diameter which decreases in the region of the exit face of the facing component part to a minimum bore diameter at the exit face.

In an embodiment of the invention according to its third aspect, the facing component part is formed with the multiplicity of holes prior to the bringing together of the facing component part and the cellular component part to form the panel and the holes are formed by electron beam drilling from an entrance face of the facing component part through to an exit face and the facing component part and the cellular component part are assembled to form the panel in such disposition that the exit face forms the front face of the facing component part and the entrance face forms the rear face of the facing component part.

In an embodiment of the invention according to its third aspect, the holes in the facing component part have bore diameters not greater than 0.020". The holes in the facing component part may advantageously have bore diameters in the range of 0.002" to 0.020".

In an embodiment of the invention according to a third aspect, the spacing between adjacent holes in the facing component part is not greater than 0.11". The spacing between adjacent holes may advantageously be in the range of 0.004" to 0.11".

In an embodiment of the invention according to its second and third aspects, the cellular component part has a wall structure which defines a multiplicity of juxtaposed cells which extend from the front face to the rear face of the cellular component part and the panel further comprises a backing component part extending across the rear face of the cellular component part.

According to a fourth aspect of the present invention, there is provided an aero engine having an engine core and a nacelle structure surrounding the core and defining a fan duct having inner and outer fan duct walls, one or each of the fan duct walls being formed by or including a noise attenuation panel according to the third aspect of the invention.

BRIEF DESCRIPTION OF THE DRAWINGS

Embodiments of the invention as applied to noise attenuation panels for a fan jet engine will now be described with reference to the accompanying drawings in which.

DETAILED DESCRIPTION OF THE PREFERRED EMBODIMENT

Figure 1:
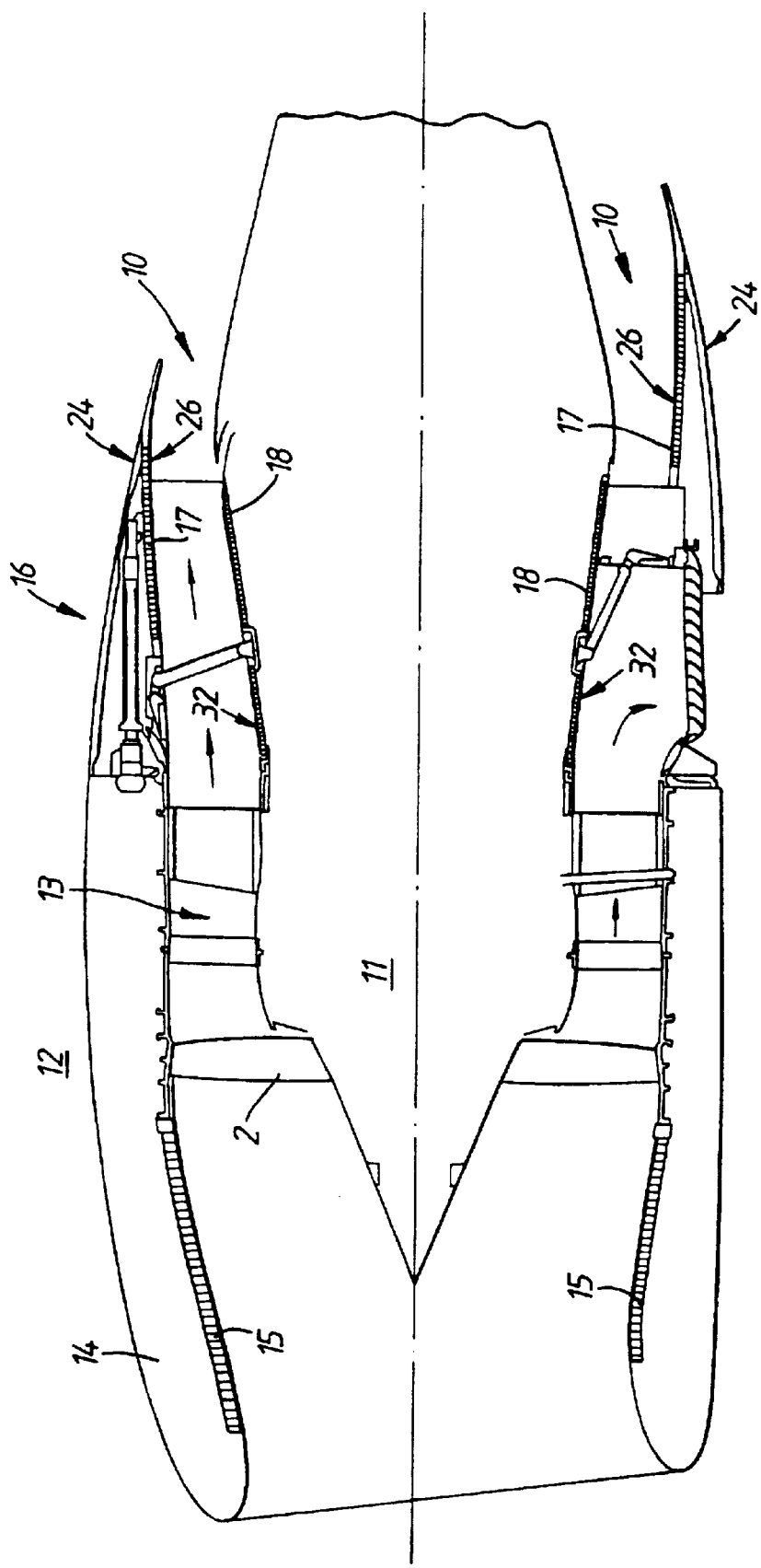
FIG. 1 is a schematic section of a fan jet engine embodying noise attenuation panels according to the invention.

Referring first to FIG. 1, the fan jet engine illustrated comprises a core engine 11 carrying fan blades 2 and surrounded by an engine nacelle structure 12 which provides an annular fan duct 13 for conducting a high speed gaseous fan stream to an annular outlet nozzle 10.

As will be seen, the nacelle structure 12 includes at its forward end an inlet cowl 14 provided with noise attenuation panels 15 which may take the form of panels according to the invention and which are constructed as hereinafter to be described with reference to FIGS. 2 and 3.

The nacelle structure 12 further includes as its rearmost end a thrust reversal unit 16 shown in the upper half of FIG. 1 in a stowed position and in the lower half of FIG. 1 in the deployed position. The thrust reversal unit 16 is an integral part of the fan stream duct 13 and discharge nozzle 10.

To reduce noise emanating in the fan duct in the region of the thrust reversal unit, the inner wall 26 of the cowl 24 and the inner fan duct wall 32 are lined with noise attenuation panels 17 and 18 which may also take the form of a noise attenuation panel to be described with reference to FIGS. 2 and 3.

Figure 2:
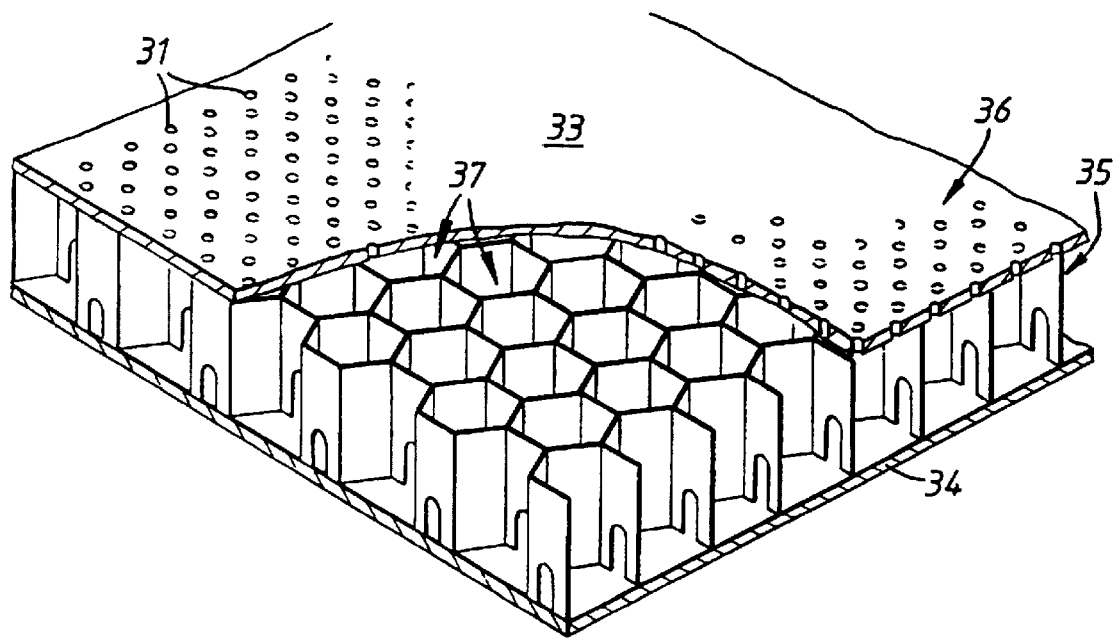
FIG. 2 is a schematic perspective view from above of a noise attenuation panel according to the invention.
Figure 3:
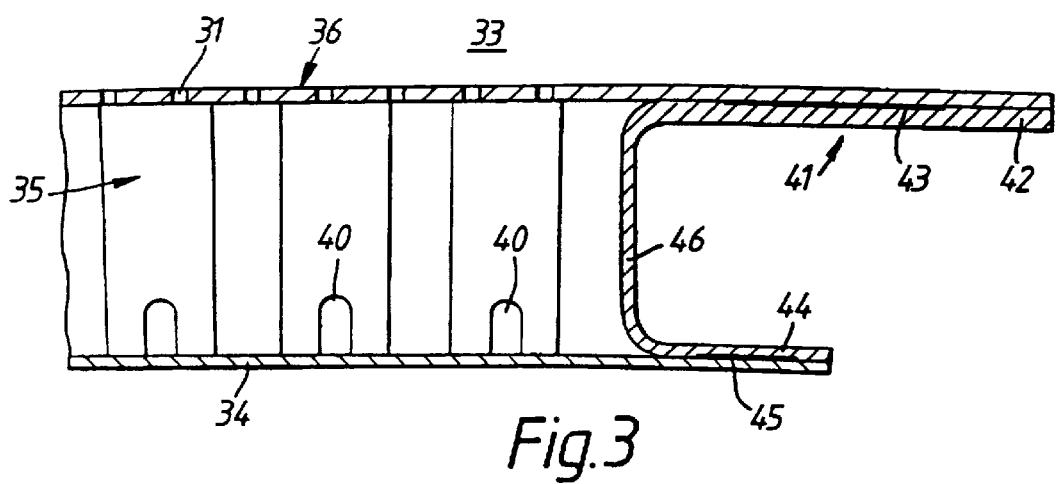
FIG. 3 is a schematic cross section of part of the panel shown in FIG. 2 secured to a supporting channel member.

Referring now to FIGS. 2 and 3, a noise attenuation panel 33 in accordance with the invention comprises a backing sheet 34, a cellular core 35 and a facing sheet 36.

The cellular core 35 comprises a multiplicity of open-ended juxtaposed cells 37 of hexagonal cross section to provide a honeycomb configuration. Alternatively, cellular cores having juxtaposed cells of other cross-sections may of course be used.

The backing sheet 34 is unperforated and made from an impermeable sheet material and is secured by an adhesive to the lower face of the cellular core 35. The facing sheet 36 is secured to the upper face of the cellular core 35 also by means of an adhesive. The cells 37 are provided with drainage slots 40 to allow for condensates to drain from the component 33.

The supporting structure for the panels 33 will usually include supporting channel members of which only one member 41 is shown in FIG. 3. The panel 33 is secured to the member 41 by bonding the facing sheet 36 to an outer face of a flange 42 of the channel member 41 using an adhesive 43 and by bonding the backing sheet 34 to the outer face of a flange 44 of the channel member 41 using an adhesive 45.

Panels 33 of arcuate form, possibly of double curvature, are embodied as structural parts at one or more locations 15, 17 and 18 of the engine illustrated in FIG. 1, each component being one of several arcuate components extending circumferentially round the nacelle structure.

Depending upon the location of the noise attenuation panel 33, the facing sheet 36 may be of aluminium alloy or titanium, the solid backing sheet 34 of an aluminium alloy, titanium, graphite or fibreglass and the cellular core of aluminium, titanium, Nomex, fibreglass or any other suitable structural material.

The facing sheet 36 is, as shown in FIGS. 2 and 3, formed with a multiplicity of holes 31 to provide gaseous fluid communication between the cells 37 of the cellular core 35 and the front face of the sheet 36.

The holes 31 of the facing sheet 36 are formed prior to the bringing together of the facing sheet 36 and the cellular core 35 and are obtained by electron beam drilling a blank facing sheet as now to be described with reference to FIGS. 4A to 4D and 5A to 5D.

A conventional electron beam gun is employed for generating the required electron beam and comprises an electrically heated cathode which produces electrons, an anode maintained at a very high potential with respect to the cathode which serves to accelerate the electrons. produced by the cathode to speeds of approximately two thirds the speed of light. The electrons diverging, but controlled, pass through the anode and are focused by a focusing coil to bring the beam into focus at target surface of a specimen which is to be subjected to electron beam drilling and which is mounted on a specimen support in a chamber under vacuum conditions. The specimen is movable within the chamber on the support to bring the beam to selected locations of the target surface of the specimen.

An electron beam gun suitable for carrying out the drilling procedure is shown schematically in FIG. 1 of the colour plates following page 150 of the publication "Plasma, Electron and Laser Beam Technology" by Yoshiaki Arata published by American society of Metals (1986) in which electron beam gun technology is discussed.

Figure 4A:
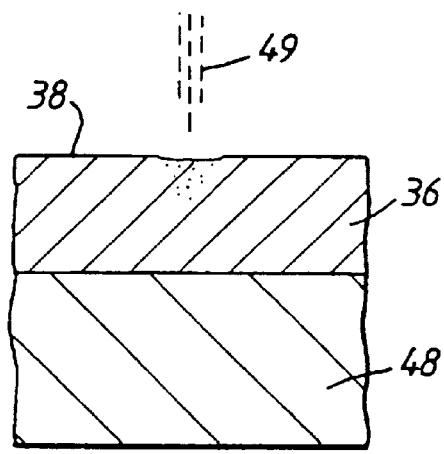
FIGS. 4A to 4D are schematic side views showing successive stages in the electron beam drilling of a blank facing sheet.
Figure 4B:
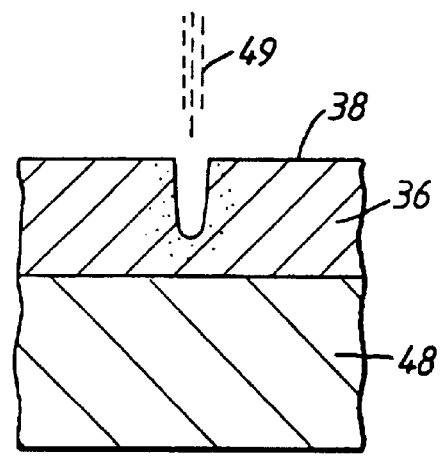
Figure 4C:
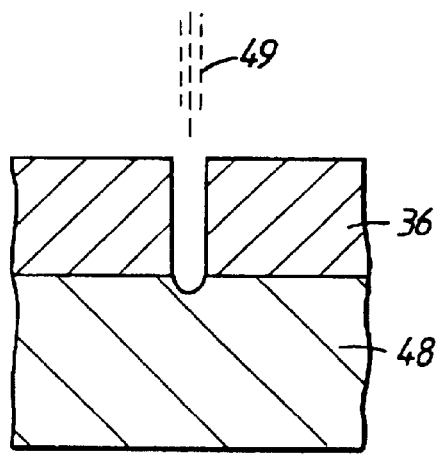

Referring now to FIGS. 4A to 4D, in the use of the electron beam gun for forming the drilled holes in the facing sheet 36 a blank facing sheet 36 is placed on a backing sheet 48 as illustrated in FIG. 4A and the two sheets mounted on the specimen support in the electron gun chamber where a beam 49 is focused on to face 38 of the sheet 36 at a location at which a hole 31 in sheet 36 is required. FIGS. 4A to 4D illustrate four progressive stages in the production of a hole 31 by the electron beam 49. The beam 49 brings the material of the sheet 36 to a vapour state and produces a vapour capillary which is surrounded by a cylinder of molten material which is progressively generated in the sheet 36 as shown in FIG. 4B until the beam impinges upon the backing sheet 14 as shown in FIG. 4C. The material of the backing sheet 14 is such as to generate a large volume of gas which expands explosively through the capillary and ejects the cylinder of molten material surrounding it to leave behind the hole 31 shown schematically in FIG. 4D. At the beam entry at the entrance face 38, the drilled hole 31 normally features a slight rounding or flaring. The edge of the hole at the beam exit face is always sharp and burr-free.

During the drilling procedure the facing sheet 36 is moved on the specimen support to bring the beam 49 to each location requiring a drilled hole 31 in the sheet 36 and the beam 49 is arranged to be blanked off during movement of the sheet 36 and restarted at the new drilling position.

Figure 4D:
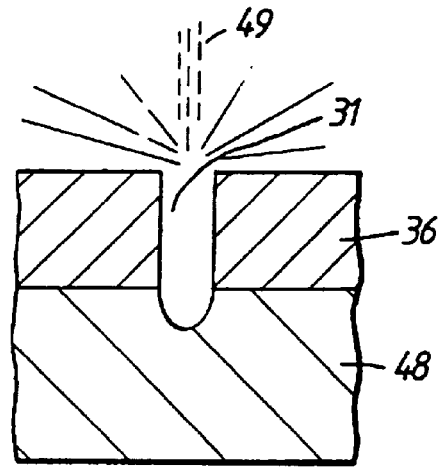

The drilled hole 31 in FIG. 4D is shown for illustration purposes only as being of constant cross-section from the entrance face to the exit face of the sheet 36. In practice however the hole geometry is determined by working parameters of the electron beam generated by the gun and by the diameter-to-length ratio of the hole and it has been found that particularly advantageous hole geometries can be obtained by optimising the working parameters and the diameter-to-length ratio over a wide range, examples of which are illustrated in FIGS. 5A to 5D and now to be described.

Figure 5A:
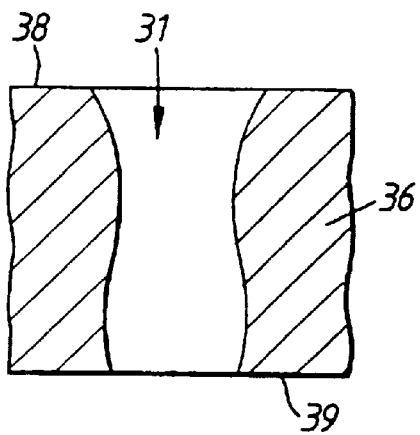
FIGS. 5A to 5D are schematic sectional side views showing cross-sectional bore geometries achievable in a facing sheet by electron beam drilling.

In the hole geometry shown in FIG. 5A the hole is flared outwardly at the entrance face 38, then reduces to a neck portion. It then enlarges in the direction of the exit face 39 and finally reduces in diameter to terminate at the exit face 39.

Figure 5B:
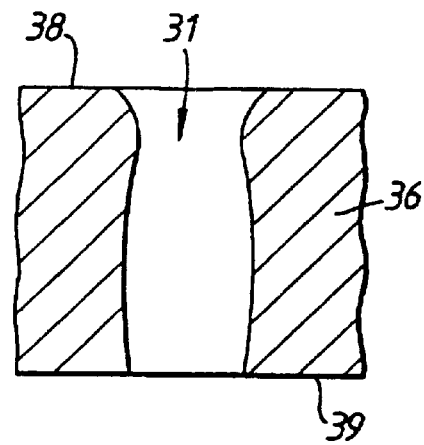

In another hole geometry shown in FIG. 5B, the hole 31 commences with a flared section at the entrance fade 38, abruptly forms a neck portion which is then followed by a first enlarging and then reducing portion where it terminates at the exit face 39.

Figure 5C:
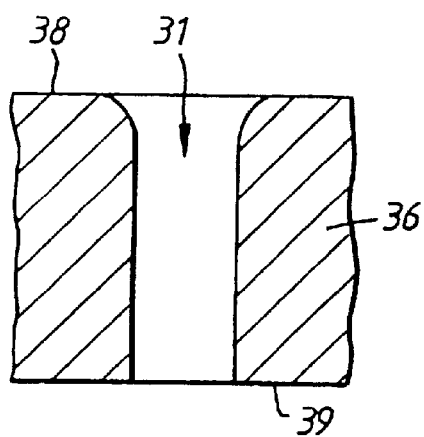

In the hole geometry shown in FIG. 5C, the hole is flared at the entrance face 38 and then follows a constant cross-section to the exit face 39.

Figure 5D:
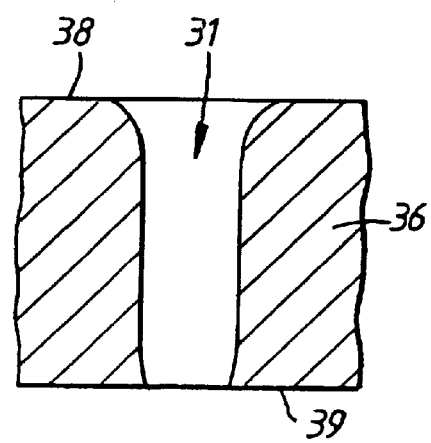

In the hole geometry shown in FIG. 5D, the hole is flared at the entrance face 38 from which then follows a constant cross-section in the direction of the exit face until it is completed by a progressively reducing section until it terminates with a minimum bore diameter at the exit face 39.

In accordance with the invention in its broadest aspect, the electron beam drilling is required to produce drilled holes in which each drilled hole has a bore diameter which decreases along the bore in the direction of the exit face throughout the bore or at least a part or parts of the bore and which does not at any point of the bore increase along the bore in the direction of the exit face.

It will be seen that the hole geometries of FIGS. 5A and 5B of the drilled facing sheet 36 do not meet the above requirements as to bore diameter as at points along the bore they do increase in bore diameter in the direction of the exit face.

On the other hand, the hole geometries shown in FIGS. 5C and 5D of the drilled facing sheet 36 have bore diameters which do not at any point of the bore increase along the bore in the direction of the exit face 39 and furthermore each has a part in which the bore diameter decreases along the bore in the direction of the exit face. Each of the facing sheets 36 having these hole geometries thus fulfil the requirements for the facing component part in the second processing step in the method of manufacturing a noise attenuation panel according to the first aspect of the invention.

Accordingly, the drilled facing sheet 36 having the hole geometries shown in FIGS. 5C and 5D can be used in the third processing step called for in the method of manufacturing a noise attenuation panel according to the first aspect of the invention. In particular, the drilled facing sheet 36 and the cellular core 35 are brought together in such disposition that the exit face 39 forms the front face of the noise attenuation panel 33 as described with reference to FIGS. 2 and 3.

The panel thus produced also fulfils the requirements of the noise attenuation panel according to the second aspect of the invention.

It will however be apparent that arranging for the bore diameter to decrease in the region of the exit face 39 to a minimum bore diameter at the exit face 39 as illustrated in FIG. 5D provides a hole geometry for the facing sheet 36 best suited to reducing the tendency for the hole to become blocked when the facing sheet 36 is assembled on the cellular core 35 with the exit face 39 forming the front face of the noise attenuation panel.

In producing holes with the hole geometry of FIG. 5D, any material blocking a hole 31 at the front face would be limited in size to the minimum bore diameter of the hole 31 and would readily be dislodged by high velocity air at the front face of the panel and cleared from the hole by passage through it as the diameter of the blocking material would be smaller than the diameter of the bore through which it passes and the blocking material would effectively "fall" through the hole 31.

The materials employed for the facing sheet 36 in the embodiments of the invention hereinbefore described include titanium and aluminium alloys.

Advantages of utilising the method of manufacturing a noise attenuation panel according to the first aspect of the invention include:

(i) electron beam drilling provides a rapid method of perforating a metallic facing sheet of a noise attenuation panel to provide holes of diameters in the range of 0.002" to 0.020" with a spacing in the range of 0.004" to 0.11". The acoustic efficiency of noise attenuation panels in meeting specified flow resistances is consequently increased by this decrease in conventional hole diameters and spacing.

(ii) electron beam drilling enables an optimisation of the acoustic performance of a noise attenuation panel through the ability to extensively vary hole diameters and hole spacing/open areas in the facing sheet of the noise attenuation panel.

(iii) hole geometries are realised which resist blockage caused by environmental contamination and thus extend the acoustic efficiency of the panel.

What is claimed is:

1. An aeroengine nacelle defining a flow duct, the flow duct including a noise attenuation panel, the noise attenuation panel which comprises:

a cellular component part having a front face, a rear face and a structure which defines a multiplicity of cells between the front face and the rear face;

a facing component part which:
  has a front face and a rear face;
  extends across the ends of the cells of the cellular component part at the front face thereof;
with the rear face of the facing component part adjacent the front face of the cellular component part, and
is provided with a multiplicity of holes which extend through the facing component part from the front face to the rear face to provide gaseous fluid communication between the cells of the cellular component part and the front face of the facing component part for the attenuation of noise generated by gaseous fluid flow over the surface of the front face of the facing component part;
characterized in that:
  each of the multiplicity of holes in the facing component part has a bore diameter which increases along the bore in the direction of the rear face of the facing component part through the bore or at least a part or parts of the bore and which does not at any point of the bore decrease along the bore in the direction of the rear face of the facing component part.

2. A nacelle according to claim 1, wherein each of the multiplicity of holes in the facing component part of the panel has a bore diameter which decreases in the region of the front face of the facing component part to a minimum bore diameter at the front face.

3. A nacelle according to claim 1, wherein the facing component part of the panel is formed with the multiplicity of holes prior to the bringing together of the facing component part and the cellular component part to form the panel and wherein the holes are formed by electron beam drilling from the rear face of the facing component part through to the front face and wherein the facing component part and the cellular component part are assembled to form the panel.

4. A nacelle according to claim 1, wherein the holes in the facing component part of the panel have bore diameters not greater than 0.020".

5. A nacelle according to claim 4, wherein the holes in the facing component part of the panel have bore diameters in the range of 0.002" to 0.020".

6. A nacelle according to claim 5, wherein the spacing between adjacent holes in the facing component part of the panel is not greater than 0.11".

7. A nacelle according to claim 6, wherein the spacing between adjacent holes in the facing component part of the panel is in the range of 0.004" to 0.11".

8. A nacelle according to claim 6, wherein the cellular component part of the panel has a wall structure which defines a multiplicity of juxtaposed cells which extend from the front face to the rear face of the cellular component part.

9. A nacelle according to claim 1, wherein the panel further comprises a backing component part extending across the rear face of the cellular component part.

10. A nacelle according to claim 9, wherein the backing component part of the panel is unperforated and impermeable.

11. An aeroengine having an engine core and a nacelle structure surrounding the core and defining a fan duct having inner and outer fan duct walls, wherein one or each of the fan duct walls is formed by or includes a noise attenuation panel, the noise attenuation panel comprises:

a cellular component part having a front face, a rear face and a structure which defines a multiplicity of cells between the front face and the rear face;

a facing component part which:
  has a front face and a rear face;
  extends across the ends of the cells of the cellular component part at the front face thereof;
  with the rear face of the facing component part adjacent the front face of the cellular component part, and
  is provided with a multiplicity of holes which extend through the facing component part from the front face to the rear face to provide gaseous fluid communication between the cells of the cellular component part and the front face of the facing component part for the attenuation of noise generated by gaseous fluid flow over the surface of the front face of the facing component part;

characterized in that:
  each of the multiplicity of holes in the facing component part has a bore diameter which increases along the bore in the direction of the rear face of the facing component part through the bore or at least a part or parts of the bore and which does not at any point of the bore decrease along the bore in the direction of the rear face of the facing component part.

12. An aeroengine according to claim 11, wherein the each of the multiplicity of holes in the facing component part has a bore diameter which decreases in the region of the front face of the facing component part to a minimum bore diameter at the front face.

\* \* \* \* \*

UNITED STATES PATENT AND TRADEMARK OFFICE
CERTIFICATE OF CORRECTION

PATENT NO.    : 6,358,590 B1
DATED         : March 19, 2002
INVENTOR(S)   : Alan John Blair et al.

It is certified that error appears in the above-identified patent and that said Letters Patent is hereby corrected as shown below:

Column 5,
Line 50, delete the "." after "electrons".
Line 64, delete "society" and insert therefor -- Society --.

Column 6,
Lines 12 and 13, delete "14" and insert therefor -- 48 --.
Line 42, delete "fade" and insert therefor -- face --.

Column 8,
Line 50, delete "6" and insert therefor -- 1 --.

Signed and Sealed this

Eleventh Day of March, 2003

JAMES E. ROGAN
*Director of the United States Patent and Trademark Office*